United States Patent
Kurtz (10) Patent No.: US 10,544,726 B2
(45) Date of Patent: Jan. 28, 2020

(54) METHODS AND SYSTEMS FOR A FUEL INJECTOR

(71) Applicant: Ford Global Technologies, LLC, Dearborn, MI (US)

(72) Inventor: Eric Matthew Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 15/804,965

(22) Filed: Nov. 6, 2017

(65) Prior Publication Data
US 2019/0136745 A1    May 9, 2019

(51) Int. Cl.
| F02B 23/04 | (2006.01) |
| F02D 41/00 | (2006.01) |
| F02D 41/14 | (2006.01) |
| F02D 41/38 | (2006.01) |
| F02M 61/16 | (2006.01) |
| F02M 61/18 | (2006.01) |

(52) U.S. Cl.
CPC ............ *F02B 23/04* (2013.01); *F02D 41/005* (2013.01); *F02D 41/1439* (2013.01); *F02D 41/1466* (2013.01); *F02D 41/3836* (2013.01); *F02M 61/16* (2013.01); *F02M 61/18* (2013.01); *F02D 2041/389* (2013.01)

(58) Field of Classification Search
CPC .... F02B 23/04; F02D 41/1466; F02D 41/005; F02D 41/1439; F02D 41/3836; F02D 2041/389; F02M 61/16; F02M 61/18

USPC ....................................... 123/294, 27 A, 298
See application file for complete search history.

(56) References Cited

U.S. PATENT DOCUMENTS

| 3,980,056 A | * | 9/1976 | Kraus ..................... F02B 53/00 123/27 A |
| 4,779,455 A | * | 10/1988 | Kuroiwa ............... F02D 35/022 73/114.09 |
| 4,887,574 A | * | 12/1989 | Kuroiwa ............... F02D 35/022 123/406.27 |
| 4,891,970 A | * | 1/1990 | Remboski, Jr. .......... G01J 1/04 374/144 |
| 5,186,146 A | * | 2/1993 | Sohma .................. G01J 5/0014 123/406.28 |
| 6,123,273 A | * | 9/2000 | Loprinzo ................ F23C 7/004 239/400 |
| 8,955,329 B2 | * | 2/2015 | Popovic .................. F23D 14/24 239/398 |
| 9,506,439 B2 | | 11/2016 | Anders et al. |
| 9,587,606 B2 | | 3/2017 | Anders et al. |
| 10,077,724 B1 | | 9/2018 | Kurtz et al. |
| 2010/0192906 A1 | * | 8/2010 | Johnson ................. F02M 23/14 123/306 |
| 2013/0014717 A1 | * | 1/2013 | Moenster ............. F02D 35/022 123/143 B |

(Continued)

FOREIGN PATENT DOCUMENTS

WO    2004042221 A2    5/2004

*Primary Examiner* — Mahmoud Gimie
(74) *Attorney, Agent, or Firm* — Geoffrey Brumbaugh; McCoy Russell LLP (57) ABSTRACT

Methods and systems are provided for a ducted fuel injector. In one example, a method may include adjusting a temperature of combustion chamber gases in a combustion chamber and/or adjusting a fuel rail pressure in response to an amount of light sensed by a photodiode of the duct.

20 Claims, 4 Drawing Sheets

(56) References Cited

U.S. PATENT DOCUMENTS

2014/0084085 A1\* 3/2014 Hongo ................ F02M 69/047
239/463
2016/0097360 A1 4/2016 Mueller \* cited by examiner

METHODS AND SYSTEMS FOR A FUEL INJECTOR

GOVERNMENT RIGHTS

This invention was made with government support under CRADA No. SC16/01875.00.00 awarded by the Department of Energy. The government has certain rights in the invention.

FIELD

The present description relates generally to methods and systems for a fuel injector comprising air entrainment features.

BACKGROUND/SUMMARY

In diesel engines, air is drawn into a combustion chamber during an intake stroke by opening one or more intake valves. Then, during the subsequent compression stroke, the intake valves are closed, and a reciprocating piston of the combustion chamber compresses the gases admitted during the intake stroke, increasing the temperature of the gases in the combustion chamber. Fuel is then injected into the hot, compressed gas mixture in the combustion chamber, resulting in combustion of the fuel. Thus, in a diesel engine, the fuel may combust with the air in the combustion chamber due to the high temperature of the air, and may not be ignited via a spark plug as in a gasoline engine. The combusting air-fuel mixture pushes on the piston, driving motion of the piston, which is then converted into rotational energy of a crankshaft.

However, the inventors have recognized potential issues with such diesel engines. As one example, diesel fuel may not mix evenly with the air in the combustion chamber, leading to the formation of dense fuel pockets in the combustion chamber. These dense regions of fuel may produce soot as the fuel combusts. As such, conventional diesel engines include particulate filters for decreasing an amount of soot and other particulate matter in their emissions. However, such particulate filters lead to increased cost and increased fuel consumption.

Modern technologies for combating engine soot output include features for entraining air with the fuel prior to injection. This may include passages located in the injector body, as an insert into the engine head deck surface, or in engine head. Ambient air mixes with the fuel, cooling the injection temperature, prior to delivering the mixture to the compressed air in the cylinder. By entraining cooled air with the fuel prior to injection, a lift-off length is lengthened and start of combustion is retarded. This limits soot production through a range of engine operating conditions, reducing the need for a particulate filter.

However, the inventors herein have recognized potential issues with such injectors. As one example, the previously described fuel injectors may no longer sufficiently prevent soot production to a desired level in light of increasingly stringent emissions standards. As such, particulate filters may be located in an exhaust passage, thereby increasing a manufacturing cost and packaging restraint of the vehicle.

In one example, the issues described above may be addressed by a system comprising a combustion chamber comprising a duct comprising at least one flow-through passage configured to receive a fuel injection and combustion chamber gases, the flow-through passage comprising a first diameter upstream of and larger than a second diameter, the second diameter upstream of and larger than a third diameter, and where a first difference between the first and second diameters is greater than a second difference between the second and third diameters. In this way, soot production is limited or prevented when pre-combustion is detected in the passage.

As one example, the flow-through passage is integrated into one or more of a duct and nozzle tip of the fuel injector. The first diameter corresponding to an inlet of the flow-through passage and the third diameter corresponding to an outlet of the flow through passage. Additionally or alternatively, the first diameter may be the largest diameter of the flow-through passage and the third diameter may be the smallest diameter of the flow-through passage. This may provide the flow-through passage with a substantially trumpet-shape. By doing this, a duration of time a fuel injection resides in the flow-through passage may be decreased relative to flow-through passage having a fixed diameter. In this way, particulate matter output may be mitigated and/or prevented.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A, 2B, and 2C are shown approximately to scale.

DETAILED DESCRIPTION

The following description relates to systems and methods for injecting fuel into an engine cylinder. In particular, the following description relates to systems and methods for injecting diesel fuel. An engine system, such as the engine system shown in FIG. 1, may comprise one or more engine cylinders, each comprising at least one fuel injector. The fuel injectors may be direct injectors that inject fuel directly into the engine cylinders. However, when injected directly into the cylinders, diesel fuel may not mix evenly with the air in the cylinders, leading to pockets in the cylinders of denser and/or less oxygenated fuel where soot may be produced during the combustion cycle.

To reduce the amount of soot produced by an engine, air passages may be included in the engine. Specifically, the air passages may be positioned in a portion of a nozzle of the fuel injector in fluidic communication with and located within the combustion chambers. In this way, gases from a combustion chamber may flow through the air passages, where the gases may mix with a fuel injection prior to combustion. This may improve air-fuel mixing and decrease a likelihood of fuel pocket formation.

To further reduce the amount of soot produced by the engine, one or more ducts may be associated with each fuel injector of the engine. The ducts may comprise one or more air entrainment features configured to mix cylinder air with the fuel injection prior to injecting. In one example, the air entrainment features correspond to outlets of the cooled-air passages. This may prevent pre-ignition of the fuel injection while extending a lift-off length and retarding start of ignition. As such, homogeneity of the air-fuel mixture is increased, mitigating formation of fuel pockets in the cylinder.

In some examples, such as the example described in FIG. 2A, the air passages may be included in a duct coupled to the fuel injector and protruding into a cylinder space below a cylinder head. The duct is configured to increase air-fuel mixing via surface features located therein. An air passage of the duct is shown in a more detailed view in FIG. 2B. The duct, including outlets of its air passages are shown in greater detail in FIG. 2C.

Figure 3:
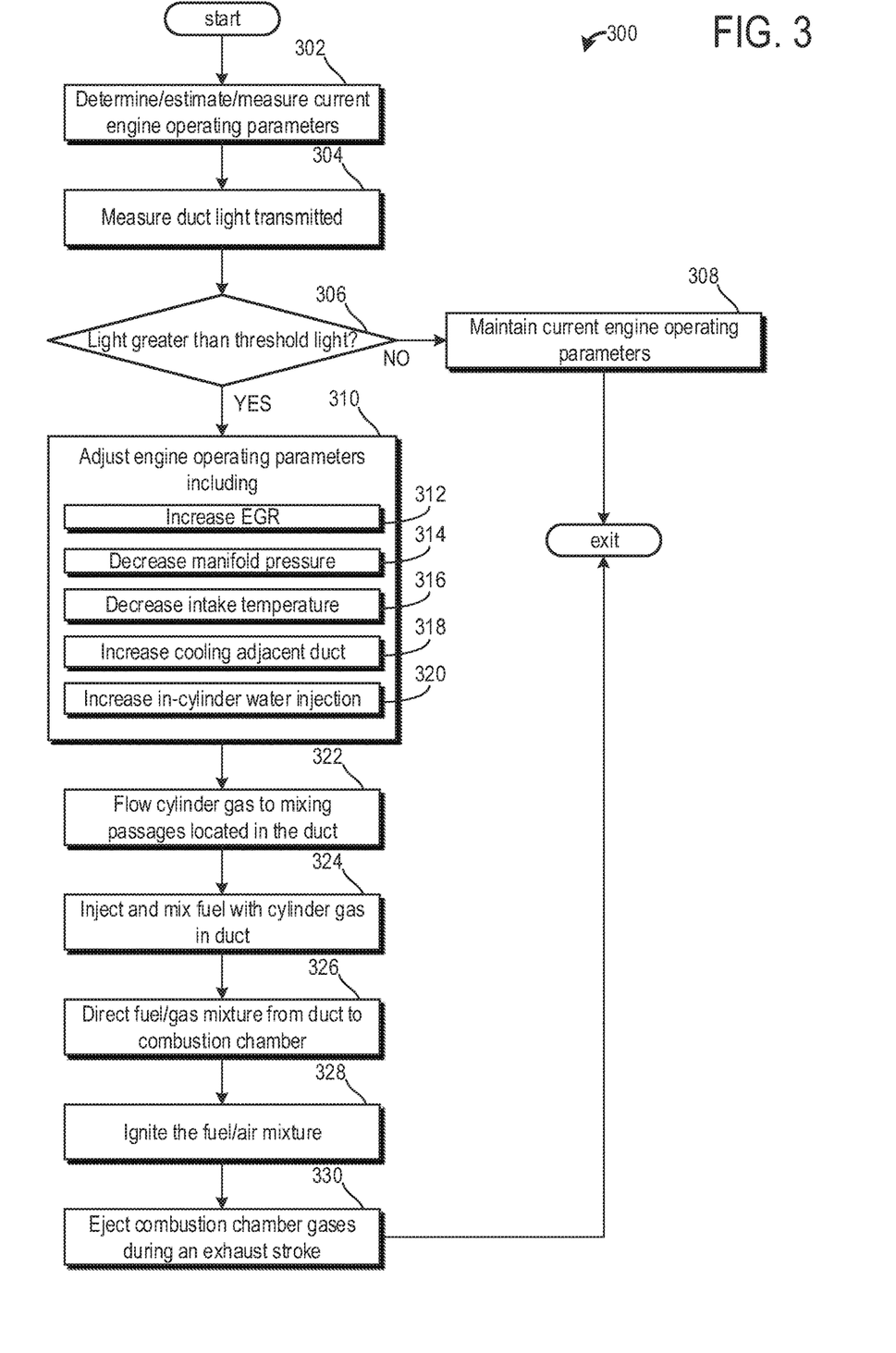
FIG. 3 shows a method for adjusting in cylinder operating conditions in response to an emissions output.
Figure 4:
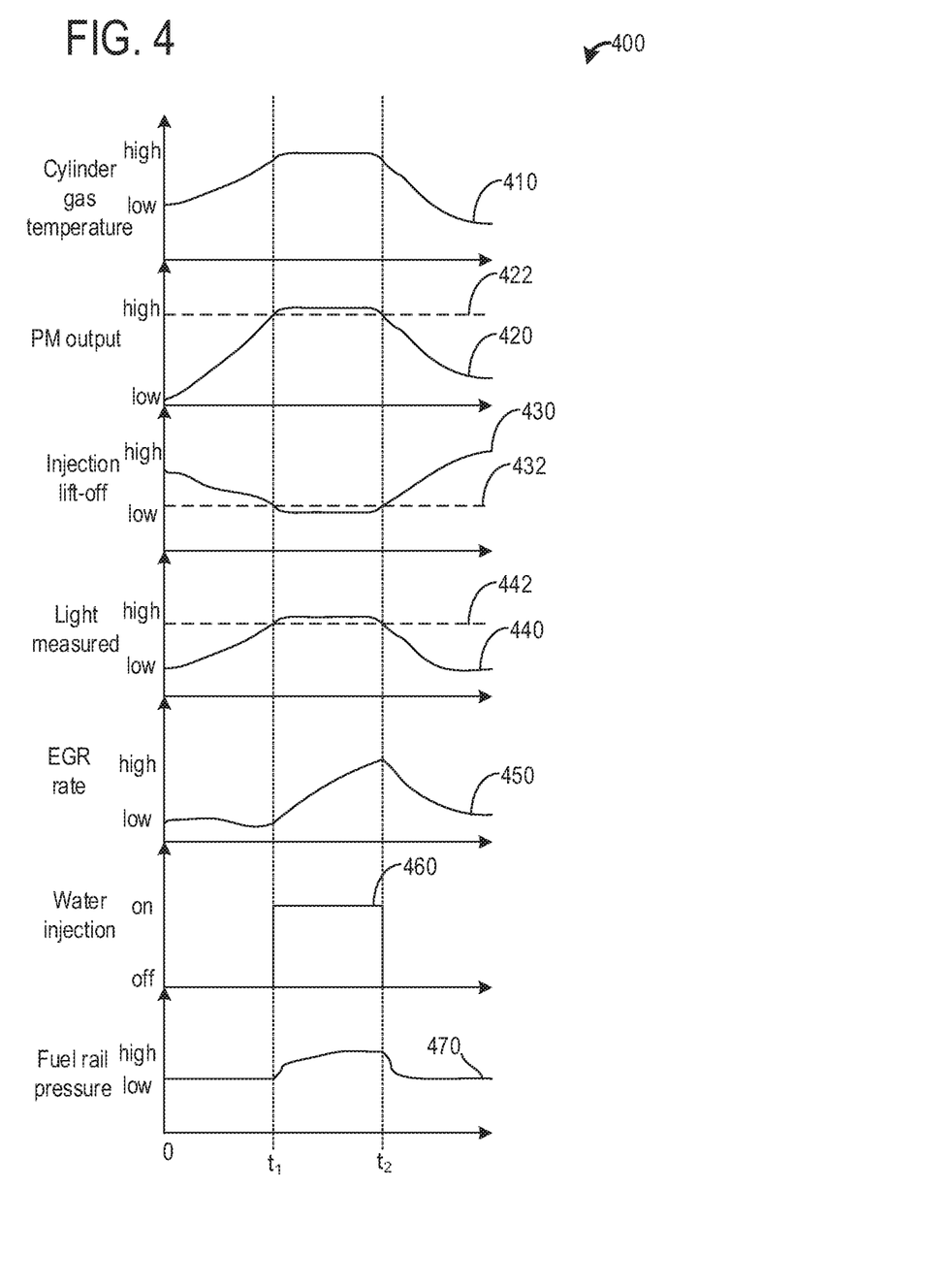
FIG. 4 shows an operational sequence based on the engine system of FIG. 1 implementing the method illustrated in FIG. 3.

In some examples, methods and systems include adjusting engine operating parameters based on in-cylinder and/or in-nozzle or in-duct conditions. For example, a photodiode may monitor light emitted in the duct and/or nozzle, thereby indicating a combustion in the duct and/or nozzle. A method for adjusting the engine operating parameters based on light emitted is shown in FIG. 3. An example timeline for adjusting engine operating parameters based on the method of FIG. 3 is shown in FIG. 4.

Figure 1:
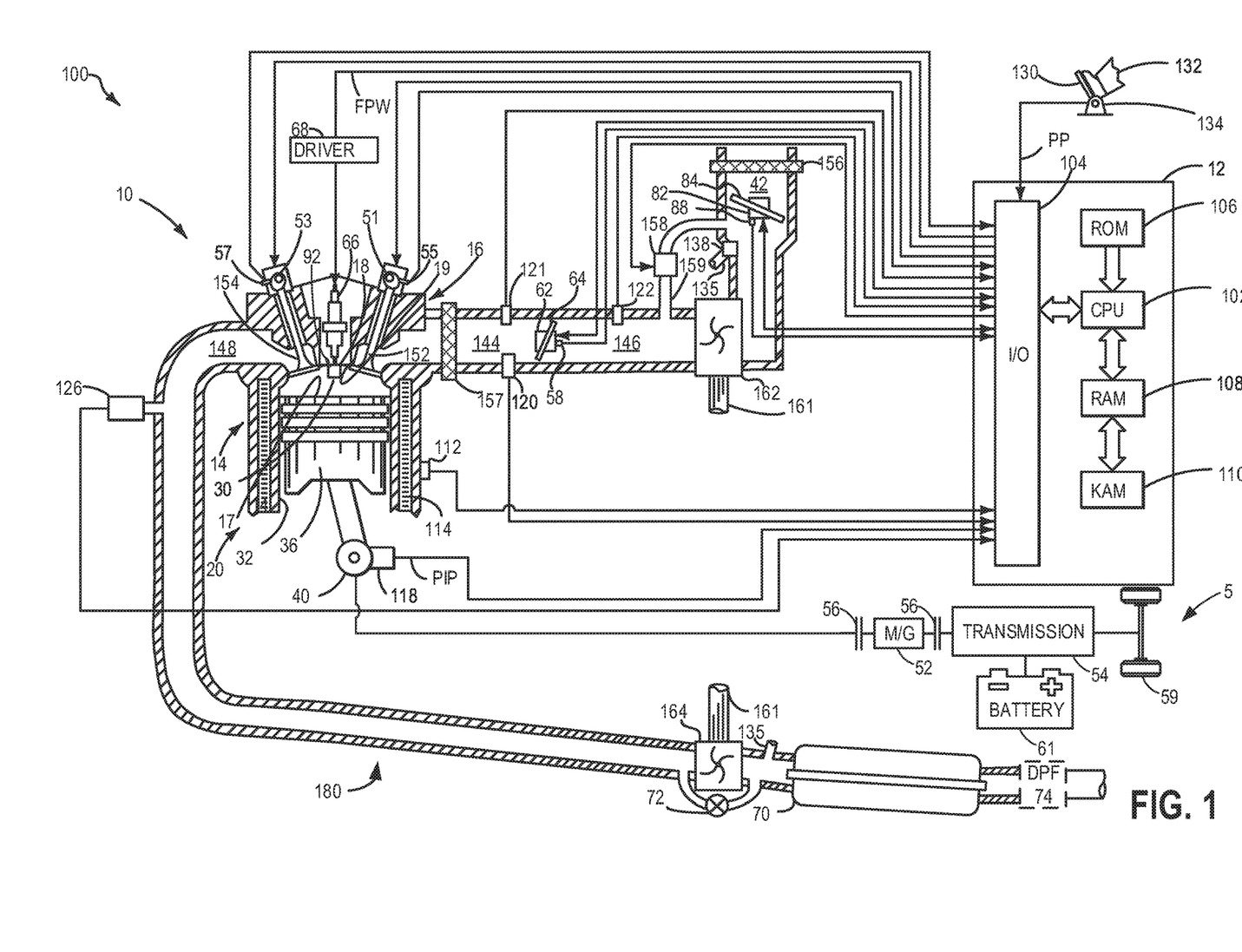
FIG. 1 shows a schematic diagram of an example engine system including a duct for entraining air with fuel.
Figure 2A:
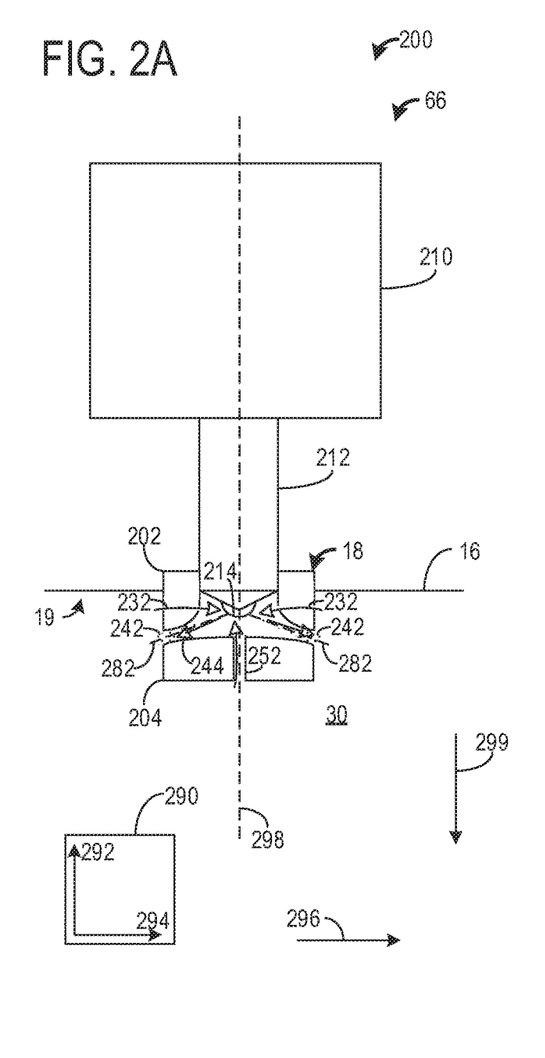
FIG. 2A shows a side, cross-sectional view of an injector and the duct.
Figure 2B:
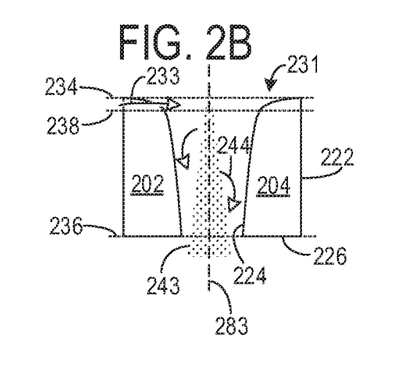
FIG. 2B shows a detailed view of a single passage of the duct.
Figure 2C:
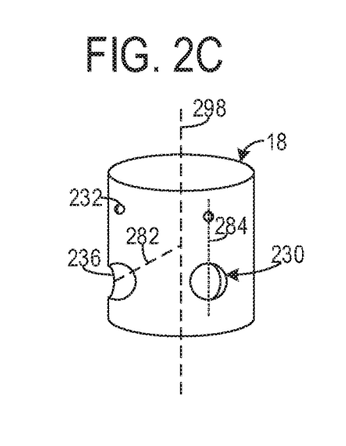
FIG. 2C shows a perspective view of the duct.

FIGS. 1-2C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred to as such, in one example. It will be appreciated that one or more components referred to as being "substantially similar and/or identical" differ from one another according to manufacturing tolerances (e.g., within 1-5% deviation).

Note that FIGS. 2A and 2B show arrows indicating where there is space for gas to flow, and the solid lines of the device walls show where flow is blocked and communication is not possible due to the lack of fluidic communication created by the device walls spanning from one point to another. The walls create separation between regions, except for openings in the wall which allow for the described fluid communication.

Air in the combustion chambers may pass through the air passages and a more thorough and even mixing of the fuel and air may be achieved prior to combustion. In particular, the lift-off length, a term commonly used by those skilled in the art to describe the distance between the fuel spray and the combustion flame, may be increased. As such, more air may be entrained by the fuel prior to combustion. Thus, combustion may be delayed and air entrainment of the fuel may be increased, leading to a more complete and soot-free combustion.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore 20, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. The cylinder bore 20 may be defined as the volume enclosed by the cylinder walls 32. The cylinder head 16 may be coupled to the cylinder block 14, to enclose the cylinder bore 20. Thus, when coupled together, the cylinder head 16 and cylinder block 14 may form one or more combustion chambers. In particular, combustion chamber 30 may be the volume included between a top surface 17 of the piston 36 and a fire deck 19 of the cylinder head 16. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore 20 may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such may the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

A duct 18 is located below the cylinder head 16 in the combustion chamber 30. Specifically, the duct 18 is entirely located within a volume of the combustion chamber 30. Alternatively, the duct 18 is partially located with the combustion chamber 30 and inside the cylinder head 16. The portion of the duct 18 located in the combustion chamber 30 may be configured with one or more air passages for mixing fuel from the fuel injector 66 with combustion chamber gases, as will be described below in FIGS. 2A, 2B, and 2C. In some examples, additionally or alternatively, the duct 18 may be omitted and the injector 66 may extend through the cylinder head 16 and into the combustion chamber 30. A portion of the injector 66 located in the combustion chamber 30 below the cylinder head 16 may be machined with air passages for mixing fuel from the fuel injector 66 with combustion chamber gases, as will be described below in FIG. 3.

The cylinder walls 32, piston 36, and cylinder head 16 may thus form the combustion chamber 30, where a top surface 17 of the piston 36 serves as the bottom wall of the combustion chamber 30 while an opposed surface or fire deck 19 of the cylinder head 16 forms the top wall of the combustion chamber 30. Thus, the combustion chamber 30 may be the volume included within the top surface 17 of the piston 36, cylinder walls 32, and fire deck 19 of the cylinder head 16.

Fuel injector 66 may be positioned to inject fuel directly into combustion chamber 30, which is known to those skilled in the art as direct injection. Specifically, the fuel injector 66 is positioned to inject fuel directly into the portion of the duct 18 located in the combustion chamber 30. Thus, fuel may flow from the injector 66 through the duct 18, and then into the combustion chamber 30. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a diesel engine, and the fuel tank may include diesel fuel, which may be injected by injector 66 into the combustion chamber 30. However, in other examples, the engine 10 may be a gasoline engine, and the fuel tank may include gasoline fuel, which may be injected by injector 66 into the combustion chamber. Further, in such examples where the engine 10 is configured as a gasoline engine, the engine 10 may include a spark plug to initiate combustion in the combustion chamber 30.

In some examples, duct 18 may be included to reduce the temperature of air that is entrained by the fuel injected from the injector 66. Specifically, when fuel exits the injector 66 during fuel injection, it may travel a distance while mixing with air in the duct 18 before combusting. In the description herein, the distance the fuel spray travels before combusting may be referred to as the "lift-off length." In particular, the lift-off length may refer to the distance the injected fuel travels before the combustion process begins. Thus, the lift-off length may be a distance between an orifice of the injector 66 from which the fuel exits the injector 66, to a point in the combustion chamber 30 at which combustion of the fuel occurs.

The duct 18 may decrease the temperature of the gases that mix with the fuel prior to combustion in the combustion chamber 30. Furthermore, the duct 18 may enable a higher axial spray velocity, for a fuel injection from the injector 66, within and at an outlet of the duct 18, thereby increasing air entrainment with the fuel injection and fuel penetration into the combustion chamber 30. In this way, the lift-off length of the fuel spray may be increased and/or an amount of air entrainment in the fuel spray may be increased. The duct 18 may be positioned inside of and in fluidic communication with combustion chamber 30, such that gases in the combustion chamber 30 may enter the one or more flow-through passages of the duct 18 and be recirculated back into the combustion chamber 30. As one example, intake air introduced into the combustion chamber 30 during an intake stroke, may be pushed into the duct 18 during all or a portion of the compression stroke. In further examples, the duct 18 may be partially positioned exterior to the combustion chamber 30, such that at least a portion of the duct 18 may be positioned within the combustion chamber 30 and a remaining portion may be positioned outside the combustion chamber 30 in the cylinder head 16.

In some examples, such as in the example of FIG. 1, the duct 18 may be positioned vertically below the cylinder head 16 with respect to the ground when coupled in an on-road vehicle. In some examples, substantially all of the duct 18 may be positioned exterior to the cylinder head 16 such that no portion of the duct 18 extends into the cylinder head 16. However, in other examples, a portion of the duct 18 may extend into the cylinder head 16.

In some examples, such as the example shown in FIG. 1, the duct 18 may be positioned between one or more outlets of the fuel injector 66 and the combustion chamber 30. Thus, fuel injected by the injector 66 may pass through the duct 18, before entering the combustion chamber 30. In particular, the injector 66, may be coupled to a top of the duct 18, where the flow-through passage(s) of the duct 18 are open to the combustion chamber 30. For example, as depicted below with reference to FIG. 2A, the top and/or upper portion of the duct 18 may be pressed against the fire deck 19 of the cylinder head 16, and/or may integrally form a portion of the fire deck 19. As such, fuel may be injected from the injector 66, and may exit the injector 66, from a position vertically above the combustion chamber 30 and cylinder block 14, and vertically above the fire deck 19 of the cylinder head 16.

A glow plug may additionally be included to heat fuel injected by the fuel injector 66 to increase combustion during for example, an engine start or engine cold start. In some examples, such as examples where the duct 18 is included between the fuel injector 66 and the combustion chamber 30, the glow plug may be coupled to the duct 18, and may extend into the duct 18. In other examples, the glow plug may be coupled to the combustion chamber 30, and may extend into the combustion chamber 30.

Intake manifold 144 is shown communicating with optional electronic throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from downstream of charge air cooler 157 to the compressor inlet. In alternate examples, compressor recirculation path 159 may be configured to recirculate compressed air from downstream of the compressor and upstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Emission control device may be a catalytic converter and as such may also be referred to herein as catalytic converter 70. Alternatively, a two-state exhaust gas oxygen sensor may be substituted for UEGO sensor 126. Converter 70 may include multiple catalyst bricks, in one example. In another example, multiple emission control devices, each with multiple bricks, can be used. Converter 70 can be a three-way type catalyst in one example. While the depicted example shows UEGO sensor 126 upstream of turbine 164, it will be appreciated that in alternate embodiments, UEGO sensor may be positioned in the exhaust manifold downstream of turbine 164 and upstream of convertor 70. Additionally or alternatively, the converter 70 may comprise a diesel oxidation catalyst (DOC) and/or a diesel cold-start catalyst.

In some examples, a diesel particulate filter (DPF) 74 may be coupled downstream of the emission control device 70 to trap soot in a direction of exhaust gas flow. In some examples, there may exist a selective catalytic reduction device and/or a lean $NO_x$ trap between the converter 70 and the DPF 74. The DPF 74 may be manufactured from a variety of materials including cordierite, silicon carbide, and other high temperature oxide ceramics. The DPF 74 may be periodically regenerated in order to reduce soot deposits in the filter that resist exhaust gas flow. Filter regeneration may be accomplished by heating the filter to a temperature that will burn soot particles at a faster rate than the deposition of new soot particles, for example, 400-600° C.

However, in other examples, due to the inclusion of duct 18 and/or flow-through passage(s) in a nozzle of the fuel injector 66, DPF 74 may not be included in the engine 10. Thus, by including the duct 18, an amount of air entrained by the fuel in the duct 18 prior to combustion in the combustion chamber 30 is increased. As such soot production during the combustion cycle may be reduced. In some examples, soot levels may be reduced to approximately zero due to the increased commingling of fuel and air prior to combustion/ignition of the mixture in the combustion chamber 30. As such, approximately no soot (e.g., zero soot) may be produced by engine 10 during the combustion cycle in some examples. In other examples, due to the inclusion of duct 18, soot production may be reduced and as such, the DPF 74 may be regenerated less frequently, reducing fuel consumption.

During the combustion cycle, each cylinder within engine 10 may undergo a four stroke cycle including: an intake stroke, compression stroke, power stroke, and exhaust stroke. During the intake stroke and power stroke, the piston 36 moves away from the cylinder head 16 towards a bottom of the cylinder increasing the volume between the top of the piston 36 and the fire deck 19. The position at which piston 36 is near the bottom of the cylinder and at the end of its intake and/or power strokes (e.g., when combustion chamber 30 is at its largest volume) is typically referred to by those of skill in the art as bottom dead center (BDC). Conversely, during the compression and exhaust strokes, the piston 36 moves away from BDC towards a top of the cylinder (e.g., fire deck 19), thus decreasing the volume between the top of the piston 36 and the fire deck 19. The position at which piston 36 is near the top of the cylinder and at the end of its compression and/or exhaust strokes (e.g., when combustion chamber 30 is at its smallest volume) is typically referred to by those of skill in the art as top dead center (TDC). Thus, during the intake and power strokes, the piston 36 moves from TDC to BDC, and during the compression and exhaust strokes, the piston 36 moves from BDC to TDC.

Further, during the intake stroke, generally, the exhaust valves 154 close and the intake valves 152 open to admit intake air into the combustion chamber 30. During the compression stroke, both valves 152 and 154 may remain closed, as the piston 36 compresses the gas mixture admitted during the intake stroke. During the compression stroke, gases in the combustion chamber 30 may be pushed into the duct 18 due to the positive pressure created by the piston 36 as it travels towards the duct 18. The gases from the combustion chamber 30 may dissipate heat through one or more of the cylinder head 16 and ambient air via conduction and/or convention. As such, the temperature of the gases in the duct 18 may be reduced relative to the temperature of the gases in the combustion chamber 30.

When the piston 36 is near or at TDC during the compression and/or power stroke, fuel is injected into the combustion chamber 30 by injector 66. During the ensuing power stroke, the valves 152 and 154 remain closed, as the expanding and combusting fuel and air mixture pushes the piston 36 towards BDC. In some examples, fuel may be injected prior to the piston 36 reaching TDC, during the compression stroke. However, in other examples, fuel may be injected when the piston 36 reaches TDC. In yet further examples, fuel may injected after the piston 36 reaches TDC and begins to translate back towards BDC during the power stroke. In yet further examples, fuel may be injected during both the compression and power strokes.

Fuel may be injected over a duration. An amount of fuel injected and/or the duration over which fuel is injected may be varied via pulse width modulation (PWM) according to one or more linear or non-linear equations. Further, the injector 66 may include a plurality of injection orifices, and an amount of fuel injected out of each orifice may be varied as desired.

The injected fuel travels through a volume of the duct 18 before entering the combustion chamber 30. Said another way, the duct 18 includes air passages and fuel passages for entraining air and fuel, wherein the passages are located inside the combustion chamber 30. However, the passages are defined by surfaces of the duct 18 and fuel and air flow through these passages before flowing outside of the duct 18 and into the combustion chamber 30 to mix with unmixed combustion chamber gases. The flow of air and fuel through the duct 18 will be described in greater detail below. It will be appreciated that the same phenomenon may occur if the duct is omitted and passages are integrated into a nozzle of the fuel injector 66 instead.

During the exhaust stroke, the exhaust valves 154 may open to release the combusted air-fuel mixture to exhaust manifold 148 and the piston 36 returns to TDC. Exhaust gases may continue to flow from the exhaust manifold 148, to the turbine 164 via exhaust passage 180.

Both the exhaust valves 154 and the intake valves 152 may be adjusted between respective closed first positions and open second positions. Further, the position of the valves 154 and 152 may be adjusted to any position between their respective first and second positions. In the closed first position of the intake valves 152, air and/or an air/fuel mixture does not flow between the intake manifold 144 and the combustion chamber 30. In the open second position of the intake valves 152, air and/or an air/fuel mixture flows between the intake manifold 144 and the combustion chamber 30. In the closed second position of the exhaust valves 154, air and/or an air fuel mixture does not flow between the combustion chamber 30 and the exhaust manifold 148. However, when the exhaust valves 154 is in the open second position, air and/or an air fuel mixture may flow between the combustion chamber 30 and the exhaust manifold 148.

Note that the above valve opening and closing schedule is described merely as an example, and that intake and exhaust valve opening and/or closing timings may vary, such as to provide positive or negative valve overlap, late intake valve closing, or various other examples.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. Pre-mature combustion may be sensed by a photodiode 92 measuring lumens in the duct 18 for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

The controller 12 receives signals from the various sensors of FIG. 1 and employs the various actuators of FIG. 1 to adjust engine operation based on the received signals and instructions stored on a memory of the controller. For example, adjusting cylinder temperatures based on a sensed light being greater than a threshold light may include adjusting an amount of EGR flowing to the engine 10. For example, EGR valve 138 may be moved closer to the fully open position. In one example, the threshold light is based on an amount of light corresponding to pre-ignition in the duct 18. As such, the mixture of fuel and air in the duct 18 is too hot and capable of igniting prior to flowing to the combustion chamber. In this way, soot formation may be greater than a desired value. Adjusting the amount of the EGR injection may include increasing the amount of EGR to decrease combustion chamber temperatures which may alleviate pre-ignition in the duct 18.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 61. Electric machine 61 may be a motor or a motor/generator. Crankshaft 40 of engine 10 and electric machine 61 are connected via a transmission 54 to vehicle wheels 59 when one or more clutches 56 are engaged. In the depicted example, a first clutch 56 is provided between crankshaft 40 and electric machine 61, and a second clutch 56 is provided between electric machine 61 and transmission 54. Controller 12 may send a signal to an actuator of each clutch 56 to engage or disengage the clutch, so as to connect or disconnect crankshaft 40 from electric machine 61 and the components connected thereto, and/or connect or disconnect electric machine 61 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 61 receives electrical power from a traction battery 58 to provide torque to vehicle wheels 59. Electric machine 61 may also be operated as a generator to provide electrical power to charge battery 58, for example during a braking operation.

Turning now to FIG. 2A, it shows a side cross-sectional view 200 of the injector 66 of engine 10 described above with reference to FIG. 1. Thus, components previously introduced may be similarly numbered in subsequent figures. FIG. 2A further includes an axis system 290 which may be used to describe the relative positioning of components of the engine system. The axis system 290 may include a vertical axis 292 parallel to a direction of gravity 299 and a lateral axis 294 parallel to a horizontal direction 296, the direction of gravity 299 being perpendicular to the horizontal direction 296. The axes 292 and 294 may be orthogonal to one another, thereby defining a two-dimensional axis system. However, it will be appreciated that the duct 18 described in more detail herein is three-dimensional and features of the duct 18 may continue and/or repeat in a three-dimensional manner as will be elaborated herein, such as in FIG. 2C. As used herein, "top/bottom", "upper/lower", and "above/below", may be relative to the vertical axis 292 and may be used to describe the positioning of elements of the figures relative to one another along the vertical axis 292. Thus, a first component described as "vertically above" a second component may be positioned vertically above and/or higher than the second component relative to the vertical axis 292 (e.g., in a positive direction along axis 292 relative to the second component). Similarly, "to the left/right of," and "to the side of" may be used to describe the positioning of elements of the figures relative to one another along the lateral axis 294 and may be used to describe the positioning of elements of the figures relative to one another along the lateral axis 294.

As depicted in the embodiment of FIG. 2A, the duct 18 may be physically coupled to a nozzle 212 extending from an injector body 210 of the fuel injector 66. The portion of the duct 18 above the cylinder head 16 may be coupled to the head via a boss, press fit, screws, clips, fusions, and/or welds. The physically coupling may hermetically seal the duct 18 to the cylinder head 16 such that pressurized contents in the cylinder do not flow through the coupling. In this way, portions of the duct 18 outside of the combustion chamber 30 and in the cylinder head 16 may not receive combustion chamber gases.

Additionally or alternatively, the duct 18 may be located completely below the cylinder head 16. As such, a top of the duct 18 may be flush with fire deck 19 of the cylinder head 16. It will be appreciated that the duct 18 may be physically coupled to the fire deck 19 via any of the coupling elements described above. Additionally, portions of the duct 18 may be pressed against the fire deck 19 to form a hermetic seal preventing the passage of gases and/or liquids therebetween. This may prevent particulates and/or an air/fuel mixture from accumulating between the duct 18 and the fire deck 19.

The fire deck 19 represents a lowest portion of the cylinder head 16 relative to the vertical axis 292. Thus, the fire deck 19 is a surface of the cylinder head 16 facing the combustion chamber 30. Furthermore, combustion chamber gases may come into contact with the fire deck 19. As described above, a volume of the combustion chamber 30 is limited by the cylinder head 16, a piston (e.g., piston 36 of FIG. 1), and cylinder side walls (e.g., cylinder side walls 32 of FIG. 1). The volume of the combustion chamber 30 includes at least a portion of the duct 18, if not an entirety of the duct 18. However, while the volume of the combustion chamber 30 is adjustable via the piston, a volume of the duct 18 is fixed and does not change. As such, when the piston is in a TDC position, it is closest to the duct 18 and the combustion chamber 30 is at a smallest volume. Alternatively, when the piston is in a BDC position, it is furthest from the duct 18 and the combustion chamber 30 is at a largest volume. Thus, the duct 18 is positioned vertically above a piston (e.g., piston 36 of FIG. 1) during the entire combustion cycle, such that the duct 18 is vertically above the piston at TDC and BDC, and any position there-between. As such, the duct 18 is positioned vertically above the piston and does not contact the piston at TDC, BDC, and any position there-between. In one example, the duct 18 is fixed and does not move. As such, the duct 18 may not be electrically, hydraulically, mechanically, and/or pneumatically powered.

Central axis 298 may represent central axes for both the duct 18 and the fuel injector 66, the central axis 298 being parallel to the vertical axis 292 and a direction of movement of the piston. In this way, the central axis 298 may pass through geometric centers of the piston, fuel injector 66, and duct 18. It will be appreciated that in some embodiments, the fuel injector 66 and duct 18 may be misaligned with the central axis 298 such that the duct 18 and the injector 66 are angled to the central axis 298 and/or radially misaligned with the central axis 298. For example, the duct 18 may be angled relative to the vertical axis 292 in some embodiments.

The duct 18 may comprise a circular cross-section along the lateral axis 294 and a rectangular cross-section along the vertical axis 292. As such, the duct 18 is cylindrical, in one example, such as in the example shown in FIG. 2C. It will be appreciated by those of ordinary skill in the art that the duct 18 may be other shapes without departing from the scope of the present disclosure. For example, the duct 18 may be frustoconical, cubical, trigonal pyramidal, and the like.

The duct 18 may comprise a variety of materials suitable for residing in a combustion environment. For example, the duct 18 may comprise iron, aluminum, carbon fiber, magnesium, steel, ceramic, and the like. In one example, the duct 18 mimics a material of the combustion chamber 30 or the cylinder head 16. Additionally or alternatively, the duct 18 may include a coating configured to prevent particulates impinging onto surfaces of the duct 18.

The duct 18 may include multiple flow-through passages 230 below the cylinder head 16. A number of flow-through passages 230 included in the duct 18 may be equal to a number of fuel injections a nozzle tip 214 is configured to inject. The flow-through passages 230 may be formed between upper 202 and lower 204 portions of the duct 18. The upper 202 and lower 204 portions of the duct 18 may be continuous and uniform, as shown in the example of FIG. 2C. However, in the cross-sections of FIGS. 2A and 2B, the upper 202 and lower 204 portions are depicted separated to illustrate the flow-through passages 230.

In the cross-section of FIG. 2A, the nozzle tip 214 is shown injecting two injections 242. Thus, two flow-through passages 230 are shown. In one example, there are exactly six flow-through passages 230. In this way, combustion chamber gases may flow in and out of the flow-through passages without flowing out of the combustion chamber 30. The duct 18 may include openings 232 arranged in a portion of the flow-through passages 230 above a lowest point of the nozzle tip 214. That is to say, the openings 232 may be arranged such that air may flow through the openings 232 and into the duct 18 above a beginning of injections 242.

An optionally, secondary air passage is shown via conduit 252, which may extend in a direction parallel to the central axis 298. The conduit 252 may be configured to allow combustion chamber gases to enter the duct 18 and merge with the injections 242 in the flow-through passages 230. Thus, the conduit 252 may be functionally similar to the openings 232.

As shown, trajectories 282 of the injections 242 may be angled relative to the fire deck 19. The angles formed between the injections 242 and the fire deck 19 may be between 5-60°. In one example, the angles formed between each of the injections 242 and the fire deck 19 are equal to 20°. Furthermore, the trajectories 282 may align with a center of each of the flow-through passages 230. This may prevent and/or mitigate contact between the injections 242 and surfaces of the flow-through passages 230 and the duct 18.

In this way, the flow-through passages 230 may be angled passages, arranged through an entire surface of the duct 18. The flow-through passages 230 align with injection orifices of the nozzle tip 214 such that injections 242 ejected therefrom may uninterruptedly pass through flow-through passages 230.

Turning now to FIG. 2B, it shows a detailed view of a flow-through passage 231, which is substantially identical to each of the flow-through passages 230 of FIG. 2A.

An opening 233, which is identical to each of the openings 232, may be a single, contiguous opening extending along an entire circumference of the upper portion 202 the duct 18, fluidly coupling the flow-through passages 230 to the combustion chamber 30. A number of openings 232 may be substantially equal to a number of flow-through passages 230. Thus, each of the flow-through passages may be configured to entrain air with an injection of the injections 242.

The flow-through passage 231 may extend from its inlet 234 to its outlet 236, where the outlet 236 is arranged near a lower portion of the duct 18. The flow-through passage 231 may follow a shape of an inner surface 224 of the upper 202 and lower 204 portions of the duct 18. In one example, the flow-through passage 231 is symmetrical and the inner surface 224 of the upper 202 and lower 204 portions are substantially identical. Specifically, the inner surface 224 is a single surface of the duct corresponding to the flow-through passage 231, the inner surface 224 being physically coupled to each of an outer surface 222 and a bottom surface 226. The outer surface 222 may extend around a greatest circumference of the duct 18 corresponding to the flow-through passage 231. The bottom surface 226 may extend from the outer surface 222 to the inner surface 224 near the outlet 236 of the flow-through passage 231. In one example, the outer surface 222 is linear and parallel to the central axis 298 and the bottom surface 226 is linear and perpendicular to the central axis 298.

The flow-through passage 231 may comprise a first diameter at the inlet 234. The inner surface 224 may be contoured such that the flow-through passage 231 comprises a second diameter at a section 238 and a third diameter at the outlet 236. In one example, the first diameter is a greatest diameter of the flow-through passage 231, the second diameter being less than the first diameter, and the third diameter being less than the second diameter. Thus, the third diameter may be a smallest diameter of the flow-through passage 231. Additionally or alternatively, a difference between the second and third diameters is less than a difference between the first diameter and the second diameter. In this way, the contour of the inner surface 224 is more extreme from the inlet 234 to the section 238 than from the section 238 to the outlet 236. Said another way. A radius of curvature of the duct 18 decreases from the inlet section 234 to the outlet section 236. In one example, a radius of curvature between the section 238 and the outlet 236 is substantially equal to zero (e.g., the inner surface 224 is linear between the section 238 and the outlet 236). Herein, the portion of the flow-through passage 231 between the inlet 234 and the section 238 may be referred to as the trumpet section and the portion of the flow-through passage 231 between the section 238 and the outlet 236 may be referred to as the nozzle section.

Specifically, the inner surface 224 may extend inwardly from the outer surface 222 toward the central axis 298 between the inlet 234 and the section 238. As such, the inner surface 224 may be convex toward a trajectory 283 of an injection 243 between the inlet 234 and the section 238. This inward extension may narrow the flow-through passage 231 such that its second diameter at the section 238 is between 60-75% of its first diameter at the inlet 234. The inner surface 224 continues to constrict and/or narrow the flow-through passage 231 from the section 238 to the outlet 236 (e.g., the nozzle section). However, the constriction between the section 238 and the outlet 236 is less severe than the constriction between the inlet 234 and the section. The third diameter at the outlet 236 may be similar to 50% of the first diameter. In this way, the flow-through passage 231 may comprise a trumpet-shape having a circular cross-section taken along the lateral axis 294, where a diameter of the cross-section decreases from the inlet 234 to the outlet 236. It will be appreciated that other dimensions (e.g., diameters and angles) may be used without departing from the scope of the present disclosure.

As shown, the inner surface 224 is smooth along the flow-through passage 231, with no indentations or protrusions extending therefrom. However, it will be appreciated by those of ordinary skill in the art that the inner surface 224 may comprise indentations and/or protrusions without departing from the scope of the present disclosure.

As an example, the first diameter decreases at a first rate toward the second diameter in the trumpet section and the second diameter decreases at a second rate toward the third diameter. The first rate may be two to five times greater than the second rate. This, combined with the trumpet section being shorter than the nozzle section along the vertical axis 292, results in the non-uniform narrowing of the flow-through passage. Additionally or alternatively, the second rate may be zero and the first rate may decay such that the radius of curvature of the flow-through passage 231 decreases from the inlet 234 to the section 238 to create a curvature of convex shape.

By constricting the flow-through passage 231, an amount of time the fuel injection 243, from nozzle tip 214 of injector 66, resides in the flow-through passage 231 is decreased relative to a passage having a uniform width and/or diameter. Thus, the decreasing diameter of the flow-through passage 231 increases injection velocity at the outlet 236 of the duct 18, thereby increasing air entrainment as the outlet 236. The trumpet-shape may further enable combustion chamber gases (shown by arrows 244) to flow through the openings 232 and into the flow-through passages 230, where the combustion chamber gases may mix and/or merge and/or combine with the fuel injection 242. As such, the fuel injection 242 may be entrained with combustion chamber gases 244 before flowing through the outlet 236 of the flow-through passages 230 and into the combustion chamber 30. In one example, the duct 18 may allow the fuel injections 242 to penetrate deeper into the combustion chamber 30 compared to a fuel injector not having the duct 18.

In the context of the embodiment of FIG. 2A, the combustion chamber 30 may depict a volume of the combustion chamber 30 excluding the flow-through passages 230 and other portions of the duct 18. As such, even though portions of the duct 18 are arranged in the combustion chamber 30, description of gases flowing through these portions (e.g., the flow-through passages 230 and the openings 232) are described independently. For example, the fuel injections 242 and combustion chamber gases 244 in the flow-through passages 230 may not be in contact with other combustion chamber gases in the combustion chamber 30 and outside of the flow-through passages 230 until the fuel injections 242 and combustion chamber gases 244 flow through the outlet 236 of the flow-through passages 230. As another example, combustion chamber gases flowing through the openings 232 may flow from the combustion chamber 30 and to the flow-through passages 230.

By entraining the fuel injection 242 and combustion chamber gases 244 in the duct 18, pockets of unburned fuel may not form in the combustion chamber, which may increase fuel economy and decrease particulate matter output.

Said another way, the duct 18 comprises a flow-through passages 230 arranged below the fire deck 19 of the cylinder head 16. The openings 232 is arranged between the inlet 234 of the flow-through passages 230 and the fire deck 19. The nozzle tip 214 may be positioned to inject below the openings 232 and into the flow-through passages 230. As such, the nozzle tip 214 and the flow-through passages 230 may be aligned along the central axis 298. The fuel injection 242 may pass through the flow-through passages 230, wherein a flow rate of the fuel injection 242 increases due to the constriction and/or narrowing of the flow-through passages 230. This increase in flow rate may result in combustion chamber gases 244 flowing through the openings 232 and into the flow-through passages 230.

Turning now to FIG. 2C, it shows a three-dimensional view of the duct 18. As shown, the openings 232 and the flow-through passages 230 extend through an entire thickness of the duct 18. Furthermore, the openings 232 are parallel to the lateral axis 294 and the flow-through passages 230 are angled to the lateral 294 and vertical 292 axes. Additionally, the openings 232 and the flow-through passages 230 are coaxial about an axis 284, wherein the axis 284 may be parallel to the vertical axis 292. An opening of the openings 232 may be arranged directly above the flow-through passages 230, wherein the openings 232 are arranged vertically above a lowest point of the nozzle tip 214. As shown, the openings 232 comprise a diameter smaller than a diameter of the outlets 236 of the flow-through passages 230. In other examples, additionally or alternatively, the openings 232 may be sized similarly to the outlets of the flow-through passages.

Turning now to FIG. 3, it shows a method 300 for adjusting engine operating parameters in response to engine soot output. Instructions for carrying out method 300 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, the method 300 includes determining, estimating, and/or measuring current engine operating parameters. Current engine operating parameters may include, but are not limited to, one or more of manifold pressure, manifold temperature, throttle position, engine speed, engine temperature, coolant temperature, vehicle speed, EGR flow rate, and air/fuel ratio.

At 304, the method 300 may include measuring a light transmitted from a flow-through passage, where the flow-through passage a duct (e.g., flow-through passages 230 of duct 18 in FIG. 2A). As described above, the passage may be configured with a photodiode adapted to measure an amount of light transmitted from the duct. An amount of light measured may be indicative of a degree of pre-ignition. Thus, when the amount of light increases, the degree of pre-ignition increases and may result in less than a desired amount of gas/fuel mixing. This may lead to increased soot formation compared to no pre-ignition occurring.

At 306, the method 300 includes determining if the light sensed by the photodiode is greater than a threshold amount of light. In one example, the threshold light is equal to an amount of light emitted from the duct corresponding to engine soot output being greater than a threshold soot output. In one example, the threshold soot output is equal to an emissions standard. In another example, the threshold soot output is equal to zero. If the sensed light is less than the threshold light, then engine soot output is less than the threshold soot output and the method 300 proceeds to 308 to maintain current engine operating parameters. In this way, engine soot output is relatively low and/or zero and engine operating parameters are not adjusted to reduce engine soot output.

If the light is greater than the threshold light, then too much pre-ignition is occurring and engine soot output is greater than the threshold soot output. The method 300 may proceed to 310 to adjust engine operating parameters.

In some embodiments, additionally or alternatively, the degree of pre-ignition is calculated based on feedback from one or more of a pressure transducer and strain gage in the duct. Additionally or alternatively, the calculation may further include feedback from an exhaust gas sensor located in an exhaust system. If excessive pressure (e.g., pressure greater than a threshold pressure), excessive strain (e.g., strain greater than a threshold strain), and/or excessive soot (e.g., soot greater than the threshold soot output) are detected, then too much pre-ignition may be occurring and the method may proceed to 310. Each of the threshold pressure and threshold strain may correspond to the same degree of pre-ignition as the threshold light.

At 310, the method 300 includes one or more of increasing EGR at 312, decreasing manifold pressure at 314, decreasing intake temperature at 316, increasing cooling in the area of the duct at 318, and increasing a water injection at 320. Increasing EGR at 312 may include adjusting an EGR valve to a more open position to allow a greater amount of EGR to flow to the intake passage. Decreasing a manifold pressure may include moving a throttle valve to a less open position. Additionally, EGR flow to the intake manifold may decrease to further decrease the intake manifold pressure. Additionally or alternatively, intake gases are directed through a charge air cooler (e.g., CAC 157 of FIG. 1) to further decrease the manifold pressure. Thus, EGR may still be increased at 312, but the EGR is directed through an EGR cooler prior to flowing to the intake manifold. Decreasing an intake temperature may include injecting water into an intake passage and/or manifold upstream of the combustion chamber. Increasing cooling in the area of the duct includes flowing coolant to portions of a cylinder cooling jacket proximal to the duct and/or nozzle tip. Increasing the water injection may include signaling to an actuator of a fuel injector located in-cylinder to injector a greater volume of water. Additionally or alternatively, an injection pressure may increase in response to the measured light being greater than the threshold light. In this way, the injection may flow into the combustion chamber more quickly than lower injection pressures, thereby mitigating a likelihood of pre-combustion. In some example, the injection pressure may decrease in response to the measured light being greater than the threshold light.

In one example, the method may apply one or more of the adjustments at 310 based on a difference between the duct light transmitted and the threshold light. For example, if the difference is relatively high and thus, the duct light transmitted is much higher than the threshold light, then one or more of the adjustments may be employed. Additionally or alternatively, a magnitude of the adjustments is increased in response to the difference being relatively high. For example, an amount of the water injection is increased. Alternatively, if the difference is relatively low (e.g., less than the relatively high difference), then fewer of the adjustments may be employed. Additionally or alternatively, the magnitude of the adjustments may be slightly decreased or not increased. For example, an amount of the water injection is a baseline (e.g., lowest) amount. In this way, combustion chamber gases may include one or more of air, water, and/or EGR.

In this way, the method 300 may adjust engine operating parameters in response to light transmitted being greater than the threshold light. The engine operating parameters may be adjusted to mitigate pre-ignition in the duct, which reduces the duct light transmitted. By doing this, fewer particulates, if any, are expelled through the exhaust valve of the combustion chamber to the exhaust manifold.

Multiple photodiodes may be included in the duct and/or nozzle tip. As such, the adjustments may be implemented based on one or more of a number of threshold lights being exceeded and a magnitude in which each of the threshold lights is exceeded. For example, if an amount of light measured exceeds the first threshold light and the second threshold light, but does not exceed the third threshold light, then the method 400 may inject water and decrease EGR flow. However, if an amount of light exceeds each of the first, second, and third threshold lights, then the method 400 may inject water, decrease EGR flow, and increase an injection pressure, in one example.

At 322, the method 300 includes flowing combustion chamber gases to the flow-through passage located in the duct. Prior to the injection, the combustion chamber gases may flow through the flow-through passage located in the duct. However, due to the nature of the fuel injection, combustion chamber gases flow through an opening of the duct, through an inlet of the flow-through passage, and into the flow-through passage, where the combustion chamber gases may mix with a fuel injection. The combustion chamber gases may be cooler following the adjustments at 310 described above compared to combustion chamber gases temperatures prior to the pre-ignition. In this way, pre-ignition in the duct may be less likely to occur.

At 324, the method 300 includes injecting and mixing fuel with combustion chamber gases in the duct. As described above, the fuel injection flows through a fuel conduit of the fuel injector before flowing out one or more injection orifices aligned with the one or more outlet passages. Combustion chamber gases from the combustion chamber flow through the opening and into the flow-through passage where the combustion chamber gases mix with a fuel injection prior to exiting the outlet passages. This mixing may limit or prevent particulate matter from escaping the cylinder. In particular, an amount of fuel to be injected may be determined based on one or more of a driver demanded torque, a desired air/fuel ratio, mass airflow rate, etc. Further, the injection timing may be adjusted based on engine operating conditions. In particular, the fuel may be injected towards the combustion chamber. In some examples, the fuel may be injected substantially parallel to and/or in line with a fuel spray conduit of the flow-through passage. Thus, the method 300 comprises mixing the injected fuel and the combustion chamber gases in the flow-through passage inside the combustion chamber.

At 326, the method 300 includes directing the mixture including the fuel injection and combustion chamber gases to mix with unmixed combustion chamber gases. The unmixed combustion chamber gases may be defined as combustion chamber gases that are not mixed with fuel. The fuel/air mixture may flow into the combustion chamber during one or more of the compression stroke and/or power stroke.

At 328, the method 300 comprises igniting the fuel/air mixture in the combustion chamber. In some examples, the fuel/air mixture may spontaneously combust due to temperatures and pressure in the combustion chamber. In other examples, the fuel/air mixture may be ignited by a glow plug.

At 330, the method 300 includes ejecting the gasses in the combustion chamber during an exhaust stroke. In particular the method 300 may comprise opening one or more exhaust valves (e.g., exhaust valves 154 described above in FIG. 1) and ejecting the combustion chamber gasses to an exhaust manifold (e.g., exhaust manifold 148 described above in FIG. 1). The method 300 may comprise only ejecting the gases in the combustion chamber to the exhaust manifold during an exhaust stroke of the piston.

In some examples, a fuel rail pressure may be proportional to an amount of particulate matter generated in the combustion chamber. As such, the fuel rail pressure may increase as the amount of particulate matter increases. Conversely, the fuel rail pressure may decrease as the amount of particulate matter generated decreases. In one example, increasing the fuel rail pressure may decrease an amount of time the fuel injection resides in the flow-through passages 230. Increasing the fuel rail pressure may also increase an amount of combustion chamber gases flowing into the flow-through passage to mix with the fuel injection. Thus, decreasing the fuel rail pressure may increase the amount of time the fuel injection resides in the flow-through passages 230. For example, if the duct light transmitted is greater than the threshold light, then the amount of particulate matter generated may be higher than a desired amount, and the fuel rail pressure may be increased. This adjustment may occur simultaneously to one or more of the adjustments at 310. Additionally or alternatively, the adjustment of the fuel rail pressure may occur independently of the adjustments at 310.

Turning now to FIG. 4, it shows an operating sequence 400 illustrating examples results for an engine having a controller (e.g., engine 10 and controller 12 of FIG. 1) implementing the method 400 of FIG. 4. Line 410 represents a combustion chamber gases temperature, line 420 represents a PM output temperature and line 422 represent a threshold PM output, line 430 represents an injection lift-off length and line 432 represents a threshold injection lift-off length, line 440 represents an amount of light measured and line 442 represents a threshold amount of light measured, line 450 represents an EGR flow rate, line 460 represents if a water injection is occurring in the combustion chamber, and line 470 represent a fuel rail pressure. The horizontal axes of each plot represent time and time increases from the left side of the figure to the right side of the figure.

Prior to $t_1$, a combustion chamber gases temperature and/or a combustion chamber gas temperature are relatively low, as shown by line 410. However, the combustion chamber gases temperature is increasing toward a high temperature. In one example, this is due to increasing engine load. As such, the injection lift-off begins to decrease from a relatively high length toward the threshold lift-off length, as shown by lines 430 and 432, respectively. The lift-off length decreases due to increasing combustion gas temperatures, which may result in an earlier combustion than desired. As such, PM output also begins to increase from a relatively low amount toward the threshold PM output, as shown by lines 420 and 422, respectively. As the lift-off length decreases, an amount of light measured by a light sensor in a duct and/or flow-through passage increases toward the threshold amount of light measured, shown by lines 440 and 442, respectively. In one example, light sensor 92 of FIG. 1 is located in the flow-through passages 230 of FIG. 2A. The threshold amount of light measured is substantially similar to the threshold light described at 306 in the method 300 of FIG. 3. Thus, combustion may occur in the duct or flow-through passage before the fuel/combustion chamber gases mixture flows into the combustion chamber when the light measured is greater than the threshold amount of light. An EGR flow rate is relatively low, as shown by line 450. A water injection is off, as shown by line 460. A fuel rail pressure is relatively low, as shown by line 470.

At $t_1$, the combustion chamber gases temperature reaches a relatively high temperature. As a result, the PM output increases to a PM output greater than the threshold PM output. Additionally, the injection lift-off decreases to a lift-off length less than the threshold lift-off length. As such, light measured by the light sensor is greater than the threshold amount of light. Thus, combustion chamber temperatures are too high, resulting in premature combustion (e.g., burning) of fuel in either in the flow-through passage of the duct. In an effort to decrease the PM output and increase injection lift-off length, the EGR flow rate increases and the water injection is activated. The fuel rail pressure increases to decrease a likelihood of the pre-combustion occurring in the flow-through passage.

After $t_1$ and prior to $t_2$, the water injection continues and the EGR flow rate continues to increase toward a relatively high EGR flow rate to aid in decreasing combustion chamber gases temperatures. By doing this, the combustion chamber gases temperature decreases, and as a result the injection lift-off increases back toward the threshold lift-off, the PM output decreases toward the threshold PM output, and the light measured decreases toward the threshold amount of light measured. The fuel rail pressure continues to increase until the fuel rail pressure reaches a relatively high pressure.

At $t_2$, the combustion chamber gases temperature has sufficiently decreased such that the PM output decreases to a PM output less than the threshold PM output, the injection lift-off increases to an injection lift-off length greater than the threshold injection lift-off, and the light measured decreases to an amount of light less than the threshold amount of light measured. As such, the water injection is terminated and the EGR flow rate decreases. The water injection may be performed by an injector positioned to inject water into the combustion chamber in an area outside of and/or spaced away from the duct or nozzle tip. In some examples, additionally or alternatively, one or more of the water injection and EGR flow rate are maintained to maintain the combustion chamber gases temperature relatively low. This may be based on a combustion stability, EGR demand, and/or an amount of water available from a water reservoir fluidly coupled to an injector configured to inject into the cylinder. The fuel rail pressure may begin to decrease in response to the PM output decreasing below the threshold PM output.

After $t_2$, the combustion chamber gases temperature decreases to a relatively low temperature. The PM output is less than the threshold PM output. The injection lift-off is greater than the threshold injection lift-off. The lift measured is less than the threshold light measured. The EGR flow rate continues to decrease and the water injection remains deactivated. The fuel rail pressure returns to a relatively low pressure.

In this way, a fuel injector may be fitted with a duct comprising a flow-through passage. The flow-through passage decreasing in diameter from its inlet, which is adjacent to a fuel injector nozzle, to its outlet distal to the fuel injector nozzle. By doing this, the fuel injection may reside in the flow-through passage for a shorter amount of time while still sufficiently mixing with combustion chamber gases to decrease particulate matter output. The technical effect of mixing combustion gases with a fuel injection inside the flow-through passage before flowing the fuel injection to the combustion chamber is to decrease particulate matter output. By premixing the fuel and combustion gas, pocket of unburned fuel may not form in the combustion chamber, which may not only increase fuel economy, but also prevent particulate matter output.

A system comprises a combustion chamber comprising a duct comprising at least one flow-through passage configured to receive a fuel injection and combustion chamber gases, the flow-through passage comprising a first diameter upstream of and larger than a second diameter, the second diameter upstream of and larger than a third diameter, and where a first difference between the first and second diameters is greater than a second difference between the second and third diameters. A first example of the system further includes where the first diameter corresponds to an inlet of the flow-through passage and the third diameter corresponds to an outlet of the flow-through passage. A second example of the system, optionally including the first example, further includes where the flow-through passage is arranged below a fire deck of a head of the combustion chamber, and where the duct further comprises at least one opening between the flow-through passage and the fire deck, the at least one opening fluidly coupling the flow-through passage to the combustion chamber. A third example of the system, optionally including the first and/or second examples, further includes where the flow-through passage receives a fuel injection from a fuel injector of the combustion chamber through its first diameter, and where combustion chamber gases flow through the at least one opening and mix with the fuel injection in the flow-through passage. A fourth example of the system, optionally including one or more of the first through third examples, further includes where the duct further comprises a photodiode configured to measure an amount of light transmitted from the duct.

A method comprises measuring an amount of light sensed in a passage fluidly coupling a fuel injector to a combustion chamber via a photodiode, comparing the amount of light to a threshold light, and adjusting a fuel rail pressure in response to the comparing. A first example of the method further includes where the threshold light is based on light released in the passage when particulate matter is produced above a desired amount. A second example of the method, optionally including the first example, further includes where adjusting the fuel rail pressure includes increasing the fuel rail pressure in response to the amount of light measured being greater than the threshold light. A third example of the method, optionally including the first and/or second examples, further includes where the increasing further includes adjusting a magnitude of the increasing in response to a difference between the amount of light measured and the threshold light, where the magnitude increases as the difference increases. A fourth example of the method, optionally including one or more of the first through third examples, further includes where adjusting an EGR flow rate, manifold pressure, manifold temperature, and water injection amount in response to the comparing. A fifth example of the method, optionally including one or more of the first through fourth examples, further includes where the passage is arranged below a head of the combustion chamber and aligning with a central axis of a fuel injector of the combustion chamber.

An engine system comprises a fuel injector positioned to inject across an opening into a duct, where a diameter of the duct is largest at a first end near the injector, the diameter decreasing at a first rate in a trumpet section, and where the diameter decreases at a second rate in a nozzle section, downstream of the trumpet section, and where the second rate is less than the first rate. A first example of the engine system further includes where the first rate is two to five times larger than the second rate. A second example of the engine system, optionally including the first example, further includes where the trumpet section corresponds to an inlet of a flow-through passage of the duct, and where the nozzle section corresponds to an outlet of the flow-through passage, and where the inlet is fluidly coupled to a combustion chamber via the opening and the outlet is directly fluidly coupled to the combustion chamber. A third example of the engine system, optionally including the first and/or second examples, further includes where the diameter decreases along a direction of fuel injection flow through the duct. A fourth example of the engine system, optionally including one or more of the first through third examples, further includes where a controller with computer-readable instructions stored on non-transitory memory thereof that when executed allow the controller to decrease a combustion chamber temperature in response to an amount of light measured by a light sensor in the duct when the amount of light measured is greater than a threshold light. A fifth example of the engine system, optionally including one or more of the first through fourth examples, further includes where the duct comprises a flow-through passage aligned with a nozzle of a fuel injector along a central axis, and where the duct further comprises a contoured inner surface in face-sharing contact with the flow-through passage. A sixth example of the engine system, optionally including one or more of the first through fifth examples, further includes where the inner surface comprises a first angle relative to the central axis in the trumpet section, and where the inner surface comprises a second angle relative to the central axis in the nozzle section, and where the first angle is greater than the second angle. A seventh example of the engine system, optionally including one or more of the first through sixth examples, further includes where the first angle is between 45 to 80 degrees and where the second angle is between 5 to 30 degrees. An eighth example of the engine system, optionally including one or more of the first through seventh examples, further includes where the duct comprises no other inlets or additional outlets other than the opening and an outlet of the nozzle section.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a combustion chamber comprising a duct comprising at least one flow-through passage configured to receive a fuel injection and combustion chamber gases, an inner surface of the at least one flow-through passage continuously constricting from an outer surface of an upper portion of the duct to a bottom surface of a lower portion of the duct to provide a convex contour comprising a first diameter upstream of and larger than a second diameter, the second diameter upstream of and larger than a third diameter, and where a first difference between the first and second diameters of the inner surface of the flow-through passage is greater than a second difference between the second and third diameters of the inner surface of the flow-through passage.

2. The system of claim 1, wherein the first diameter corresponds to an inlet of the flow-through passage and the third diameter corresponds to an outlet of the flow-through passage, and wherein the first diameter corresponds to a convex portion of the duct.

3. The system of claim 1, wherein the flow-through passage is arranged below a fire deck of a head of the combustion chamber, and where the duct further comprises at least one opening between the flow-through passage and the fire deck, the at least one opening fluidly coupling the flow-through passage to the combustion chamber.

4. The system of claim 3, wherein the flow-through passage receives a fuel injection from a fuel injector of the combustion chamber through its first diameter, and where combustion chamber gases flow through the at least one opening and mix with the fuel injection in the flow-through passage.

5. The system of claim 1, wherein the duct further comprises a photodiode configured to measure an amount of light transmitted from the duct.

6. A method comprising:
   measuring an amount of light sensed in a passage fluidly coupling a fuel injector to a combustion chamber via a photodiode;
   comparing the amount of light to a threshold amount of light to estimate an engine soot output; and
   adjusting a fuel rail pressure in response to the comparing to reduce the engine soot output.

7. The method of claim 6, wherein the threshold amount of light is based on light released in the passage when particulate matter is produced above a desired amount.

8. The method of claim 6, wherein adjusting the fuel rail pressure includes increasing the fuel rail pressure in response to the amount of light measured being greater than the threshold amount of light.

9. The method of claim 8, wherein the increasing further includes adjusting a magnitude of the increasing in response to a difference between the amount of light measured and the threshold amount of light, where the magnitude increases as the difference increases.

10. The method of claim 6, further comprising adjusting an EGR flow rate, a manifold pressure, a manifold temperature, and a water injection amount in response to the comparing.

11. The method of claim 6, wherein the passage is arranged below a head of the combustion chamber and aligns with a central axis of a fuel injector of the combustion chamber.

12. An engine system, comprising:
    a fuel injector positioned to inject across an opening into a duct, wherein a diameter of the duct is largest at a first end near the injector, the diameter decreasing at a first rate in a trumpet-shaped section, wherein the diameter decreases at a second rate in a nozzle section, downstream of the trumpet-shaped section, and wherein the second rate is less than the first rate.

13. The engine system of claim 12, wherein the first rate is two to five times larger than the second rate.

14. The engine system of claim 12, wherein the trumpet-shaped section corresponds to an inlet of a flow-through passage of the duct, wherein the nozzle section corresponds to an outlet of the flow-through passage, and wherein the inlet is fluidly coupled to a combustion chamber via the opening and the outlet is directly fluidly coupled to the combustion chamber.

15. The engine system of claim 12, wherein the diameter of the duct decreases along a direction of fuel injection flow through the duct.

16. The engine system of claim 12, further comprising a controller with computer-readable instructions stored on non-transitory memory thereof that, when executed, allow the controller to adjust an engine operating parameter to decrease a combustion chamber temperature in response to an amount of light measured by a light sensor in the duct when the amount of light measured is greater than a threshold amount of light.

17. The engine system of claim 12, wherein the duct comprises a flow-through passage aligned with a nozzle of a fuel injector along a central axis, and wherein the duct further comprises a contoured inner surface in face-sharing contact with the flow-through passage.

18. The engine system of claim 17, wherein the inner surface comprises a first angle relative to the central axis in the trumpet-shaped section, wherein the inner surface comprises a second angle relative to the central axis in the nozzle section, and wherein the first angle is greater than the second angle.

19. The engine system of claim 18, wherein the first angle is between 45 to 80 degrees and where the second angle is between 5 to 30 degrees.

20. The engine system of claim 12, wherein the duct comprises no other inlets or additional outlets other than the opening and an outlet of the nozzle section.

* * * * *